US010279255B2

(12) United States Patent
Stafford et al.

(10) Patent No.: US 10,279,255 B2
(45) Date of Patent: May 7, 2019

(54) POSITION-DEPENDENT GAMING, 3-D CONTROLLER, AND HANDHELD AS A REMOTE

(71) Applicant: SONY INTERACTIVE ENTERTAINMENT INC., Minato-ku (JP)

(72) Inventors: Jeffrey R. Stafford, Redwood City, CA (US); Yunpeng Zhu, Foster City, CA (US); Steven Osman, San Francisco, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 704 days.

(21) Appl. No.: 14/880,889

(22) Filed: Oct. 12, 2015

(65) Prior Publication Data

US 2016/0030845 A1 Feb. 4, 2016

Related U.S. Application Data

(63) Continuation of application No. 12/835,671, filed on Jul. 13, 2010, now Pat. No. 9,159,165.

(51) Int. Cl.
*A63F 13/426* (2014.01)
*A63F 13/26* (2014.01)
(Continued)

(52) U.S. Cl.
CPC ............ *A63F 13/426* (2014.09); *A63F 13/06* (2013.01); *A63F 13/213* (2014.09); *A63F 13/26* (2014.09);
(Continued)

(58) Field of Classification Search
CPC ........ A63F 13/06; A63F 13/213; A63F 13/26; A63F 13/426; A63F 13/5258;
(Continued)

(56) References Cited

U.S. PATENT DOCUMENTS 4,787,051 A 11/1988 Olson
4,843,568 A 6/1989 Krueger
(Continued)

FOREIGN PATENT DOCUMENTS

CN 101002475 A 7/2007
CN 101374090 A 2/2009
(Continued)

OTHER PUBLICATIONS

Japanese Application No. 2016-058279, Office Action dated Feb. 14, 2017, 6 pages.
(Continued)

*Primary Examiner* — Katrina R Fujita
(74) *Attorney, Agent, or Firm* — Kilpatrick Townsend & Stockton LLP

(57) ABSTRACT

Methods and systems for using a position of a mobile device with an integrated display as an input to a video game or other presentation are presented. Embodiments include rendering an avatar on a mobile device such that it appears to overlay a competing user in the real world. Using the mobile device's position, view direction, and the other user's mobile device position, an avatar (or vehicle, etc.) is depicted at an apparently inertially stabilized location of the other user's mobile device or body. Some embodiments may estimate the other user's head and body positions and angles and reflect them in the avatar's gestures.

20 Claims, 10 Drawing Sheets

(51) Int. Cl.
*G06T 19/00* (2011.01)
*A63F 13/20* (2014.01)
*A63F 13/213* (2014.01)
*A63F 13/5258* (2014.01)
*G06F 3/00* (2006.01)
*H04N 5/232* (2006.01)

(52) U.S. Cl.
CPC .......... *A63F 13/5258* (2014.09); *G06F 3/005* (2013.01); *G06T 19/006* (2013.01); *H04N 5/23229* (2013.01); *A63F 2300/105* (2013.01); *A63F 2300/204* (2013.01); *A63F 2300/301* (2013.01); *A63F 2300/5553* (2013.01); *A63F 2300/5573* (2013.01); *A63F 2300/6676* (2013.01); *A63F 2300/69* (2013.01); *G06T 2207/30196* (2013.01)

(58) Field of Classification Search
CPC .......... A63F 2300/105; A63F 2300/204; A63F 2300/301; A63F 2300/5553; A63F 2300/5573; A63F 2300/6676; A63F 2300/69; G06T 19/006; G06T 2207/30196; G06F 3/005; H04N 5/23229
See application file for complete search history.

(56) References Cited

U.S. PATENT DOCUMENTS

| | | |
|---|---|---|
| 5,128,671 A | 7/1992 | Thomas, Jr. |
| 5,528,265 A | 6/1996 | Harrison |
| 5,831,664 A | 11/1998 | Wharton et al. |
| 5,929,849 A | 7/1999 | Kikinis |
| 6,157,368 A | 12/2000 | Faeger |
| 6,247,022 B1 | 6/2001 | Yankowski |
| 6,375,572 B1 | 4/2002 | Masuyama |
| 6,522,312 B2 * | 2/2003 | Ohshima ................ A63F 13/00 273/309 |
| 6,615,268 B1 | 9/2003 | Philyaw et al. |
| 6,993,573 B2 | 1/2006 | Hunter |
| 7,036,083 B1 | 4/2006 | Zenith |
| 7,200,857 B1 | 4/2007 | Rodriguez et al. |
| 7,209,942 B1 | 4/2007 | Hori et al. |
| 7,398,000 B2 | 7/2008 | Green |
| 7,427,996 B2 * | 9/2008 | Yonezawa ............. G06T 19/006 345/629 |
| 7,536,706 B1 | 5/2009 | Sezan et al. |
| 7,549,052 B2 | 6/2009 | Haitsma et al. |
| 7,581,034 B2 | 8/2009 | Polivy et al. |
| 7,599,580 B2 | 10/2009 | King et al. |
| 7,898,504 B2 | 3/2011 | Fischer |
| 8,037,496 B1 | 10/2011 | Begeja et al. |
| 8,188,969 B2 | 5/2012 | Morin et al. |
| 8,251,290 B1 | 8/2012 | Bushman et al. |
| 8,253,649 B2 | 8/2012 | Imai et al. |
| 8,463,000 B1 | 6/2013 | Kaminski, Jr. |
| 8,560,583 B2 | 10/2013 | Mallinson |
| 8,644,842 B2 | 2/2014 | Arrasvuori et al. |
| 8,730,156 B2 * | 5/2014 | Weising ................ G09G 5/08 345/156 |
| 8,730,354 B2 | 5/2014 | Stafford et al. |
| 8,838,671 B2 | 9/2014 | Wies et al. |
| 8,874,575 B2 | 10/2014 | Mallinson |
| 8,907,889 B2 * | 12/2014 | Sweetser ............. G06F 3/0346 345/156 |
| 9,113,217 B2 | 8/2015 | Mallinson |
| 9,143,699 B2 | 9/2015 | Osman |
| 9,264,785 B2 | 2/2016 | Mallinson |
| 9,473,820 B2 | 10/2016 | Mallinson |
| 9,513,700 B2 * | 12/2016 | Weising ................ G09G 5/08 |
| 9,703,369 B1 * | 7/2017 | Mullen ................ G06F 3/01 |
| 9,901,828 B2 * | 2/2018 | Miller ................ G06T 19/006 |
| 2002/0028000 A1 | 3/2002 | Conwell et al. |
| 2002/0059604 A1 | 5/2002 | Papagan |
| 2002/0078456 A1 | 6/2002 | Hudson et al. |
| 2002/0085097 A1 | 7/2002 | Colmenarez et al. |
| 2002/0140855 A1 | 10/2002 | Hayes |
| 2002/0162118 A1 | 10/2002 | Levy et al. |
| 2002/0186676 A1 | 12/2002 | Milley et al. |
| 2003/0028873 A1 | 2/2003 | Lemmons |
| 2003/0093790 A1 | 5/2003 | Logan et al. |
| 2003/0152366 A1 | 8/2003 | Kanazawa et al. |
| 2003/0156144 A1 | 8/2003 | Morita |
| 2003/0171096 A1 | 9/2003 | Ilan et al. |
| 2003/0185541 A1 | 10/2003 | Green et al. |
| 2003/0212762 A1 | 11/2003 | Barnes et al. |
| 2004/0001161 A1 | 1/2004 | Herley |
| 2004/0210824 A1 | 10/2004 | Shoff et al. |
| 2004/0212589 A1 | 10/2004 | Hall et al. |
| 2005/0005308 A1 | 1/2005 | Logan et al. |
| 2005/0108026 A1 | 5/2005 | Brierre |
| 2005/0123267 A1 | 6/2005 | Tsumagari |
| 2005/0193425 A1 | 9/2005 | Sull et al. |
| 2005/0220439 A1 | 10/2005 | Carton et al. |
| 2005/0227674 A1 | 10/2005 | Kopra et al. |
| 2005/0262548 A1 | 11/2005 | Shimojo et al. |
| 2006/0038833 A1 | 2/2006 | Mallinson et al. |
| 2006/0053472 A1 | 3/2006 | Goto et al. |
| 2006/0064734 A1 | 3/2006 | Ma |
| 2006/0184960 A1 | 8/2006 | Horton et al. |
| 2006/0285772 A1 | 12/2006 | Hull et al. |
| 2007/0106551 A1 | 5/2007 | McGucken |
| 2007/0113263 A1 | 5/2007 | Chatani |
| 2007/0124756 A1 | 5/2007 | Covell et al. |
| 2007/0130580 A1 | 6/2007 | Covell et al. |
| 2007/0136773 A1 | 6/2007 | O'Neil et al. |
| 2007/0143777 A1 | 6/2007 | Wang et al. |
| 2007/0143778 A1 | 6/2007 | Covell et al. |
| 2007/0162863 A1 * | 7/2007 | Buhrke ............... G06F 3/04815 715/757 |
| 2007/0169115 A1 | 7/2007 | Ko et al. |
| 2007/0248158 A1 | 10/2007 | Vieron et al. |
| 2007/0250716 A1 | 10/2007 | Brunk et al. |
| 2008/0215679 A1 | 9/2008 | Gillo et al. |
| 2008/0226119 A1 | 9/2008 | Candelore et al. |
| 2008/0246694 A1 | 10/2008 | Fischer |
| 2008/0267584 A1 | 10/2008 | Green |
| 2008/0275763 A1 | 11/2008 | Tran et al. |
| 2008/0276278 A1 | 11/2008 | Krieger et al. |
| 2009/0019474 A1 | 1/2009 | Robotham |
| 2009/0037975 A1 | 2/2009 | Ishikawa et al. |
| 2009/0055383 A1 | 2/2009 | Zalewski |
| 2009/0063277 A1 | 3/2009 | Bernosky et al. |
| 2009/0123025 A1 | 5/2009 | Deng et al. |
| 2009/0154806 A1 | 6/2009 | Chang et al. |
| 2009/0228921 A1 | 9/2009 | Miki et al. |
| 2009/0285444 A1 | 11/2009 | Erol et al. |
| 2009/0327894 A1 | 12/2009 | Rakib et al. |
| 2010/0007050 A1 | 1/2010 | Kagawa et al. |
| 2010/0053164 A1 | 3/2010 | Imai et al. |
| 2010/0086283 A1 | 4/2010 | Ramachandran et al. |
| 2010/0091198 A1 | 4/2010 | Matsuo |
| 2010/0100581 A1 | 4/2010 | Landow et al. |
| 2010/0119208 A1 | 5/2010 | Davis et al. |
| 2010/0122283 A1 | 5/2010 | Button |
| 2010/0149072 A1 | 6/2010 | Waeller et al. |
| 2010/0166309 A1 | 7/2010 | Hull et al. |
| 2010/0222102 A1 | 9/2010 | Rodriguez |
| 2010/0257252 A1 | 10/2010 | Dougherty et al. |
| 2010/0275235 A1 | 10/2010 | Joo et al. |
| 2010/0309225 A1 | 12/2010 | Gray et al. |
| 2010/0318484 A1 | 12/2010 | Huberman et al. |
| 2010/0322469 A1 | 12/2010 | Sharma |
| 2011/0053642 A1 | 3/2011 | Lee |
| 2011/0071838 A1 | 3/2011 | Li-Chun Wang et al. |
| 2011/0078729 A1 | 3/2011 | LaJoie et al. |
| 2011/0103763 A1 | 5/2011 | Tse et al. |
| 2011/0246495 A1 | 10/2011 | Mallinson |
| 2012/0013770 A1 | 1/2012 | Stafford et al. |
| 2012/0059845 A1 | 3/2012 | Covell et al. |
| 2012/0086630 A1 | 4/2012 | Zhu et al. |
| 2012/0099760 A1 | 4/2012 | Bernosky et al. |
| 2012/0143679 A1 | 6/2012 | Bernosky et al. |

(56) References Cited

U.S. PATENT DOCUMENTS

| | | | |
|---|---|---|---|
| 2012/0210349 A1 | 8/2012 | Campana et al. | |
| 2013/0141419 A1* | 6/2013 | Mount | G06F 3/011 345/419 |
| 2013/0194437 A1 | 8/2013 | Osman | |
| 2013/0198642 A1 | 8/2013 | Carney et al. | |
| 2015/0026716 A1 | 1/2015 | Mallinson | |
| 2015/0156542 A1 | 6/2015 | Covell et al. | |
| 2015/0358679 A1 | 12/2015 | Mallinson | |
| 2015/0379043 A1 | 12/2015 | Hull et al. | |
| 2016/0014350 A1 | 1/2016 | Osman | |
| 2016/0112762 A1 | 4/2016 | Mallinson | |
| 2017/0013313 A1 | 1/2017 | Mallinson | |
| 2017/0013314 A1 | 1/2017 | Mallinson | |

FOREIGN PATENT DOCUMENTS

| | | |
|---|---|---|
| CN | 101651834 A | 2/2010 |
| EP | 1053642 A1 | 11/2000 |
| EP | 2180652 A1 | 4/2010 |
| JP | P2000242661 A | 9/2000 |
| JP | 2000-287184 A | 10/2000 |
| JP | P2001-036875 A | 2/2001 |
| JP | P2002-118817 A | 4/2002 |
| JP | P2002-198840 A | 7/2002 |
| JP | 2005-532578 A | 10/2005 |
| JP | 2006-5897 A | 1/2006 |
| JP | P2007-088801 A | 4/2007 |
| JP | 2008-283344 A | 11/2008 |
| JP | P2009-033769 A | 2/2009 |
| KR | 2008-0101075 A | 11/2008 |
| KR | 2009-0043526 A | 5/2009 |
| WO | 2004004351 A1 | 1/2004 |
| WO | 2004034281 A1 | 4/2004 |
| WO | 2005006610 A1 | 1/2005 |
| WO | 2007064641 A2 | 6/2007 |
| WO | 2008024723 A2 | 2/2008 |
| WO | WO2008/025407 A1 | 3/2008 |
| WO | 2008/051538 A2 | 5/2008 |
| WO | 2008056180 A2 | 5/2008 |
| WO | 2009032707 A1 | 3/2009 |
| WO | 2009036435 A1 | 3/2009 |
| WO | 2010020739 A1 | 2/2010 |

OTHER PUBLICATIONS

U.S. App. No. 12/835,657, Notice of Allowance dated Sep. 21, 2017, 8 pages.

Chinese Application No. 201510087918.9, Office Action dated Mar. 30, 2017, 9 pages.

Chinese Application No. 201310454576.0, Office Action dated May 2, 2017, 18 pages.

U.S. Appl. No. 14/860,239, Notice of Allowance dated Apr. 25, 2017, 9 pages.

U.S. Appl. No. 12/835,657, Notice of Allowance dated Jul. 18, 2017, 9 pages.

U.S. Appl. No. 13/554,963, Notice of Allowance dated Jul. 28, 2017, 8 pages.

Bolt, R.A., "Put-that-there": voice and gesture at the graphics interface, Computer Graphics, vol. 14, No. 3 (ACM SIGGRAPH Conference Proceedings) Jul. 1980, pp. 262 270.

DeWitt, Thomas and Edelstein, Phil, "Pantomation: A System for Position Tracking," Proceedings of the 2$^{nd}$ Symposium on Small Computers in the Arts, Oct. 1982, pp. 61-69.

Mohan et al., "Bokode: Imperceptible Visual tags for Camera Based Interaction from a Distance," ACM Transactions on Graphics, Jul. 2009, vol. 28(3), Article No. 98, pp. 1-2.

Mark Toner, Abstract of dissertation provided by Mr. Toner and purported to be maintained at Liverpool University, 1 page.

Tanaka et al., JP 2008-210683 article, Japanese language, PW080056, vol. 97, No. 1, Feb. 4, 1997, Information Processing Society of Japan, pp. 1-5.

Tanaka et al., Partial Translation of Ref., "Interactive Video Navigation System by Using the Media Fusion Technique of Video/TV and World Wide Web," Information Processing Society of Japan, Feb. 4, 1997, pp. 3-4.

PCT Application No. PCT/US2011/042456, International Search Report and Written Opinion, dated Nov. 4, 2011, 8 pages.

* cited by examiner

POSITION-DEPENDENT GAMING, 3-D CONTROLLER, AND HANDHELD AS A REMOTE

CROSS-REFERENCES TO RELATED APPLICATIONS

This application is a continuation of U.S. application Ser. No. 12/835,671, filed Jul. 13, 2010, entitled "POSITION-DEPENDENT GAMING, 3-D CONTROLLER, AND HANDHELD AS A REMOTE," which is hereby incorporated by reference in its entirety for all purposes.

This application is related to U.S. application Ser. No. 14/860,239, filed Sep. 21, 2015, entitled "OVERLAY NON-VIDEO CONTENT ON A MOBILE DEVICE," which is a continuation of U.S. application Ser. No. 13/554,958, filed Jul. 20, 2012, now U.S. Pat. No. 9,143,699, entitled "OVERLAY NON-VIDEO CONTENT ON A MOBILE DEVICE," which is a continuation-in-part of U.S. patent application Ser. No. 12/835,645, filed Jul. 13, 2010, now U.S. Pat. No. 8,730,354, entitled "OVERLAY VIDEO CONTENT ON A MOBILE DEVICE," and which claims the benefit of U.S. Provisional Application No. 61/527,048, filed Sep. 12, 2011, entitled "OVERLAY NON-VIDEO CONTENT ON A MOBILE DEVICE," which are hereby incorporated by reference in their entireties for all purposes, each of which is incorporated by reference herein in their entirety for all purposes.

BACKGROUND

Embodiments of the present invention relate to video display and video game entertainment devices in general and, in particular, to the rendering of avatars, vehicles, game pieces, etc. on a user's mobile device based on its look angle and/or position with respect to another user's mobile device and/or a fixed video display.

Video games are typically played by users sitting in front of a video screen. Multi-player video games are often played by users sitting in front of a common, shared video screen. The shared video screen is sometimes a large television that is connected with a video game console, such as a Sony PlayStation® 3. Wired or wireless game controllers serve as input devices to send commands from the users to the console. In some instances, data is sent from the console to the controllers to, for example, switch on and off lights on a controller, give tactile signals (e.g. force feedback) to the user, calibrate the controllers, etc.

Networked multi-player games are often played by users sitting in front of their own, personal video screens. These video games are often played from a personal computer (PC) or a video game console using a keyboard or game controllers described above. Some networked multi-player games are played from a portable handheld, smart phone, or other mobile device with its own embedded display, such as a Sony PlayStation Portable® (PSP). The display shares the same plastic housing with buttons, joysticks, rollerballs, trigger switches, and/or other input components. Some displays that are touch or stylus-sensitive also serve as input devices in addition to or in conjunction with physical buttons, etc.

To play a handheld game on a mobile device with an integrated display, a user sometimes stares down into his screen without moving. Some players attempt to stay as motionless as possible, avoiding jarring by others around them, in order to concentrate and maintain hand-eye coordination to correctly select inputs in response to the game. This head-down, motionless poise can make for a solitary experience, even when a user is playing against another human opponent. Even if the opposing, or cooperating, players are seated next to each other, physical interaction between the players can be minimal because they look with their heads down at their screens instead of toward each other. This heads-down posture can also result in getting motion sickness if one in a moving vehicle such as an automobile.

There may, therefore, be a need in the art to allow players of single-player games to better interact with their physical surroundings and players of multi-player games to better interact with one another while playing against each other.

BRIEF SUMMARY

Methods, systems, and devices are presented for augmenting video using a relative distance and direction of a mobile display from a fixed display. Movement of the mobile display can be used as an input to a video game and/or to help render graphics associated with the video game. For example, a user driving a video game jeep through a jungle may have a view out the front windshield of the jeep from a fixed display and be able to slew his mobile device up and around to look at things above and behind him in the virtual jungle.

Methods, systems, and devices are described for displaying augmented video on a display integrated in a mobile device held or worn by a first user based on the relative position of another user's mobile device and view direction of the first user's mobile device. In some embodiments, a user can hold up his device in the direction of another user and see an avatar of the other user on the display apparently at the same position in space as the other user. This can give the appearance that the user's display is simply a transparent window with the exception that his opponent's physical body is overlaid with the graphical body of an avatar.

In some embodiments, the mobile devices can be calibrated so that the position of the other user's head, body, etc. are estimated from the orientation and motion of his device so that the avatar's head, body, etc. appear at the same position as the other user. In some embodiments, face and motion tracking of a user's head, body, etc. can be used to measure the location of the user. In other embodiments, the mobile devices are glasses so that real-world head tracking of the opposing player is better measured.

Some embodiments include a system for augmenting video, comprising a video source configured to provide video content to a video display and a mobile device with an integrated video camera and display. The mobile device is configured to track a relative distance and direction of the video display using the video camera, determine a position coordinate of the mobile device using the tracked relative distance and direction, and render, on the integrated display, an object in a position based on the determined position coordinate of the mobile device.

Some embodiments include a method for augmenting video, comprising receiving a first position coordinate corresponding to a first user, the first position coordinate relative to a first video display, receiving a first view direction corresponding to the first user, the first view direction relative to the first video display, and receiving a second position coordinate corresponding to a second user, the second position coordinate relative to a second video display. The method further includes determining a direction and range from the first position coordinate to the second position coordinate and rendering, on an integrated display of a first mobile device, an object based on the determined direction and range from the first position coordinate to the second position coordinate and based on the received first view direction.

Other embodiments relate to machine-readable tangible storage media and computer systems which store or execute instructions for the methods described above.

Some embodiments include a system for augmenting video, comprising a first mobile device having a display, a second mobile device, means for determining a relative direction and range from the first mobile device to the second mobile device, and means for determining a view direction of the first mobile device. The first mobile device is configured to render on its display an avatar or vehicle from a perspective based on the relative direction and range to the second mobile device and view direction of the first mobile device.

BRIEF DESCRIPTION OF THE DRAWINGS

A further understanding of the nature and advantages of the present invention may be realized by reference to the following drawings. In the appended figures, similar components or features may have the same reference label.

The figures will now be used to illustrate different embodiments in accordance with the invention. The figures are specific examples of embodiments and should not be interpreted as limiting embodiments, but rather exemplary forms and procedures.

DETAILED DESCRIPTION

Generally, methods and systems are described for multi-player video games and other interactive video presentations for which augmented video is presented on a user's mobile device display based on the relative position of another user. A user can hold up his device and see an avatar, vehicle, game marker, target crossbars, or other object in the place of where the other user is sitting. In some embodiments, the other user's avatar on the display can move, look, etc. in the same manner as the other user's physical movements. For example, if the other user turns toward the first user, the display will show the avatar turning toward him.

In some embodiments, the users can be located in different rooms across town, but their avatars are rendered on their respective mobile device's screens as if their avatars were seated next to each other in the same room. A common reference point for each of the players can be the center of his or her fixed display.

This description provides examples only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Figure 1:
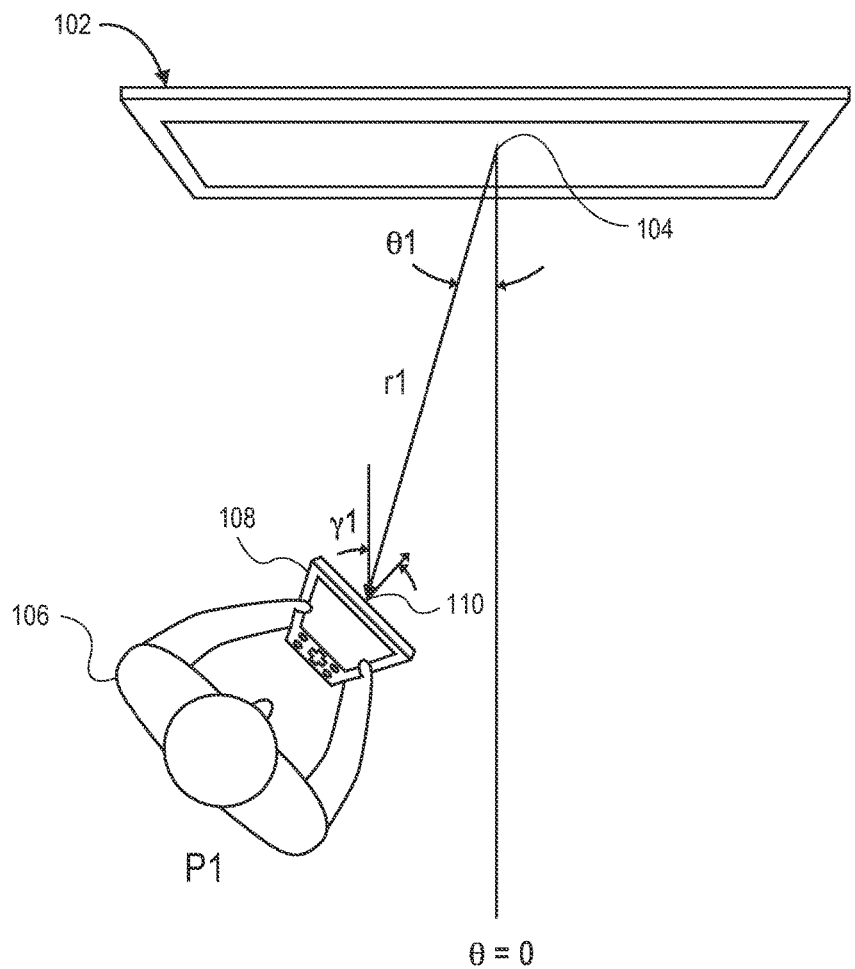
FIG. 1 illustrates a first user holding a mobile device at a first position in space relative to a display in accordance with an embodiment.

FIG. 1 illustrates a first user holding a mobile device at a first position in space relative to a fixed display. A reference frame is defined with origin 104 at the center of fixed display 102 and a polar/cylindrical angle of zero projecting perpendicularly from the plane of the screen. Player 106 (P1) holds mobile device 108 in front of him. The point at the top middle rear of mobile device 108 is reference point 110. The position of reference point 110 is measured, and the coordinates representing the position of reference point 110 in space, $(r1, \theta1, y1)$, are stored. For clarity, the figure does not show the third dimensional, vertical measurement, $y1$. Angle $\gamma1$ is P1's view direction or look angle with respect to the fixed frame of reference of the large, fixed display.

A "coordinate" is any of a set of numbers, characters, or symbols used in specifying the location of a point on a one-dimensional line, on a two-dimensional surface, or in three-dimensional space. Coordinates may be orthogonal, such as Cartesian, polar and/or cylindrical, spherical, or non-orthogonal such as those describing a location on the surface of a sphere.

A "view direction" or "look angle" is a direction in space toward which a user's face is pointed or a corresponding user's mobile device is pointed. A view direction can include azimuth and elevation angles relative to the user. A view direction can include a bearing direction in relation to a fixed point.

A mobile device can include a handheld device, such as a Portable Playstation®, a user-worn device, such as glasses with an integrated display, or other electronic devices.

Using the coordinates representing the position and view direction, the mobile display can be used as a secondary display to 'look around' the virtual environment. For example, a player driving a virtual tank can slew his mobile device to the left to see enemy troops to the left side outside of the view of the fixed display. As another example, the player can use his mobile device display to zoom into the horizon of the display. The mobile device can act as virtual binoculars to better resolve figures in the distance that might be a threat.

Figure 2:
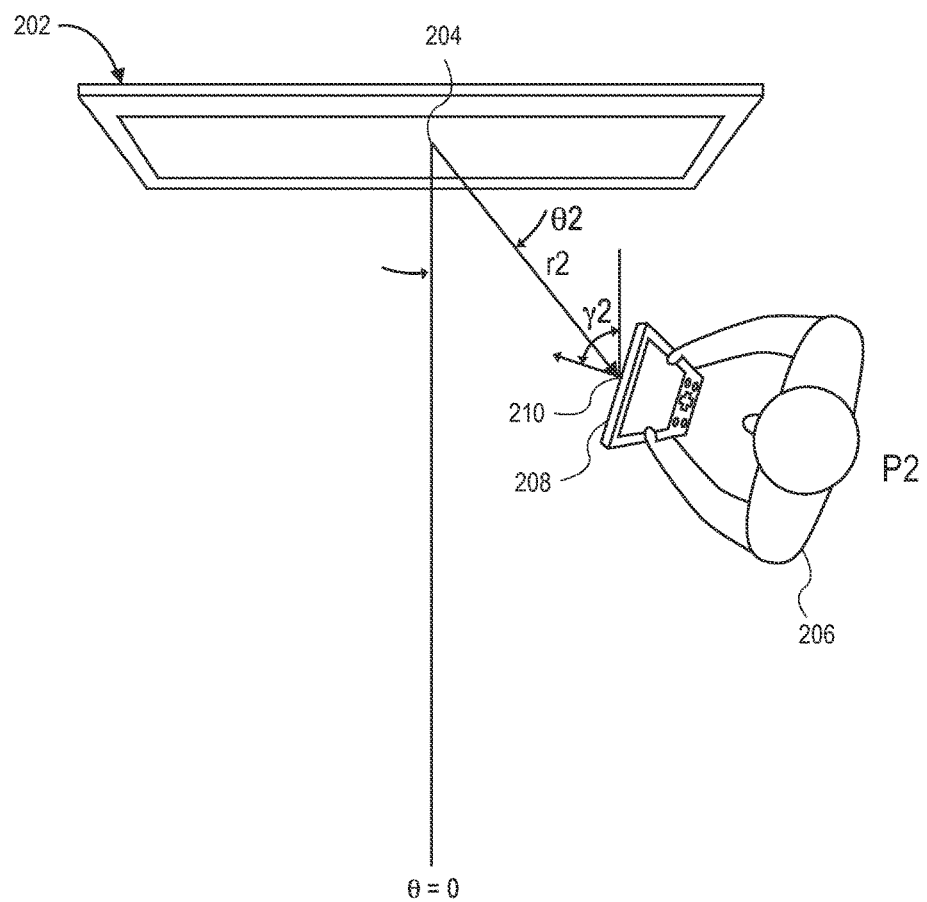
FIG. 2 illustrates a second user holding a mobile device at a second position in space relative to a display in accordance with an embodiment.

FIG. 2 illustrates a second user holding a mobile device at a second position in space relative to a fixed display. The fixed display may or may not be the same fixed display as in FIG. 1. A reference frame is defined with origin 204 at the center of fixed display 202 and a polar/cylindrical angle of zero projecting perpendicularly from the plane of the screen. Player 206 (P2) holds mobile device 208 in front of her. The point at the top middle rear of mobile device 208 is reference point 210. The position of reference point 210 is measured, and coordinates representing the position of reference point 210 in space, (r2, θ2, y2), are stored. Angle γ2 is P2's view direction with respect to the fixed frame of reference.

Figure 3:
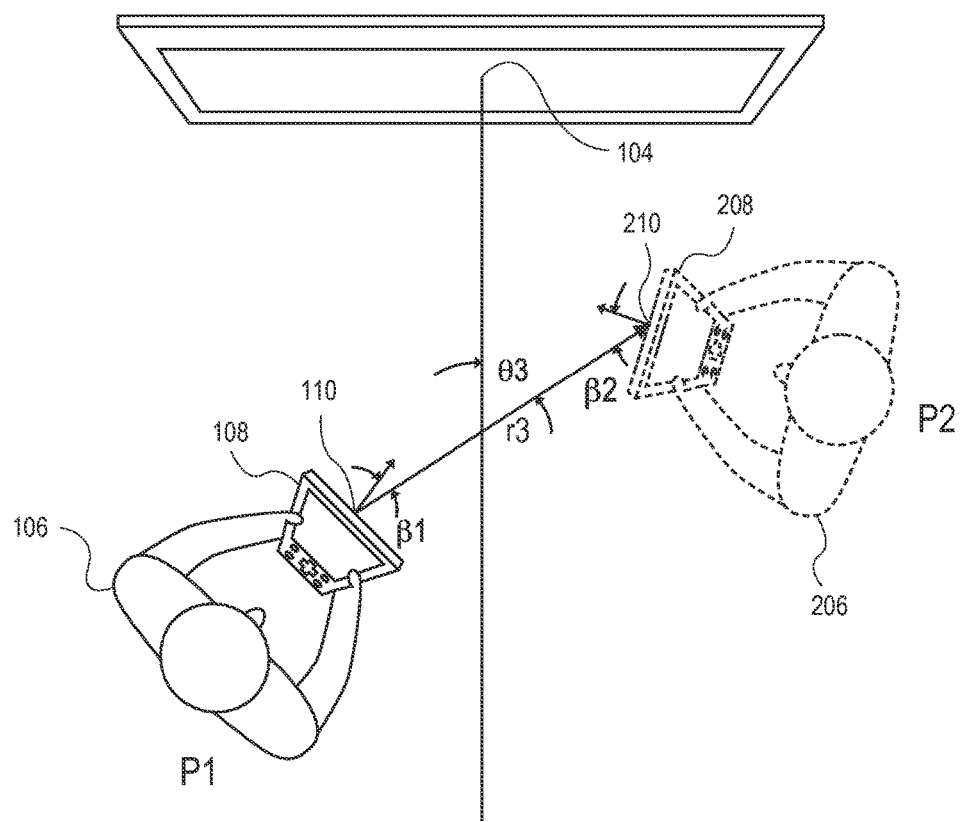
FIG. 3 illustrates a relative direction and range from the user's device of FIG. 1 to the user's device of FIG. 2 in accordance with an embodiment.

FIG. 3 illustrates a relative direction and range from the user's device of FIG. 1 (mobile device 108 of player 106) to the user's device of FIG. 2 (mobile device 208 of player 206). Vector subtracting (r1, θ1, y1) from (r2, θ2, y2) results in (r3, θ3, y3), the direction and range from reference point 110 to reference point 210 with respect to the fixed reference frame from origin 104 (or 204). The distance from reference point 110 to reference point 210 can be calculated as the positive square root of $(r3^2+y3^2)$. In this embodiment, y3 is zero, and thus the relative distance is simply r3. Subtracting γ1 from θ3 results in first view direction β1, and subtracting γ2 from θ3 results in second view direction β2.

Although polar/cylindrical coordinates are used here in the examples, other coordinate systems can be used, such as Cartesian and spherical coordinate systems.

Figure 4:
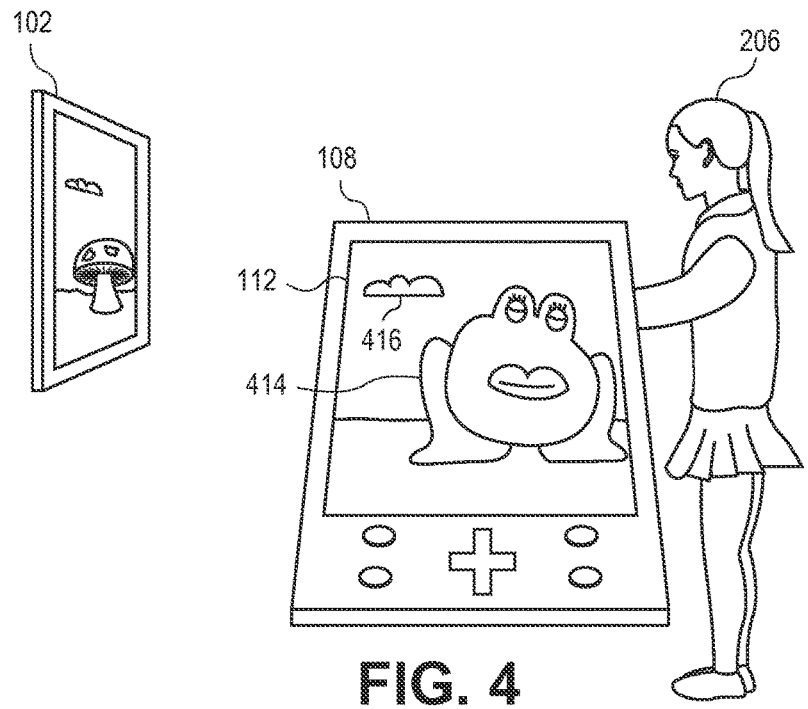
FIG. 4 illustrates an avatar displayed as if it were co-located with a second user's mobile device from a vantage point of a first user in accordance with an embodiment.

FIG. 4 illustrates an avatar displayed as if it were co-located with a second user's mobile device from a vantage point of the first user. Using the relative direction (e.g. β1) and range (e.g. r3) from the first user's handheld device to the second user's handheld device, avatar 414 is rendered on integrated display 112 of mobile device 108. From the vantage point of user 106 (not shown in this figure), avatar 414 in the virtual world appears to overlay the mobile device (occluded in this figure) of user 206 in the real world. Other objects, such as background clouds 416, are rendered with avatar 414. The view from user 206's vantage point is the view on fixed display 102. An overhead view of the positions of the users, mobile devices, and fixed display may be interpreted as that in FIG. 3.

If mobile device 108 is slewed to the right, then avatar 414 disappears off the left side of the display. If mobile device 108 is slewed to the left, then avatar 414 disappears off the right side of the display. In some embodiments, it can appear as if the embedded display is transparent and the view of the room in the background is the same, except for the other player being overlaid with graphics depicting an avatar.

Figure 5:
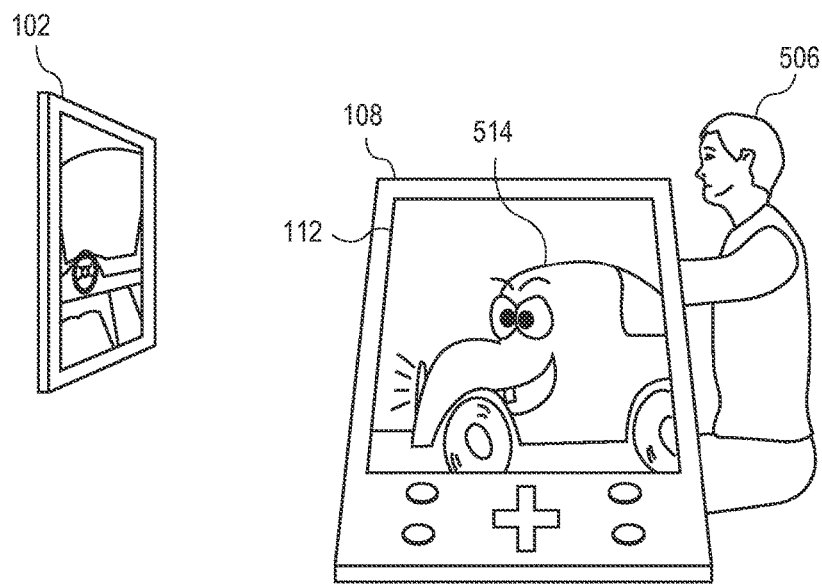
FIG. 5 illustrates a vehicle avatar displayed as if it were co-located with a second user's mobile device from a vantage point of a first user in accordance with an embodiment.

FIG. 5 illustrates vehicle 514 displayed as if it were co-located with a second user's mobile device from a vantage point of the first user. From the vantage point of user 106 (not shown in this figure), vehicle 514 in the virtual world on display 112 of mobile device 108 appears to overlay the mobile device (occluded in this figure) of user 506 in the real world.

Figure 6:
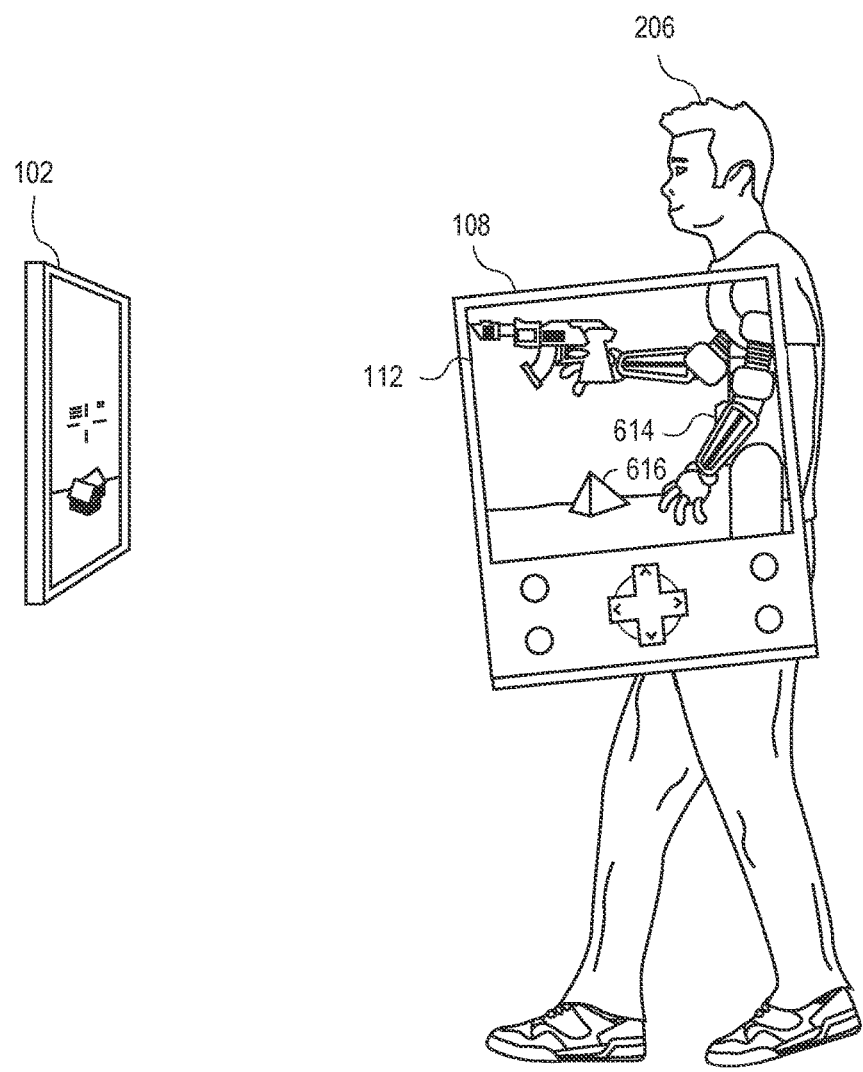
FIG. 6 illustrates an avatar displayed as if it were co-located with a second user's body from a vantage point of a first user in accordance with an embodiment.

FIG. 6 illustrates avatar 614 displayed as if it were co-located with second user's body 206 from a vantage point of the first user 106 (not shown in this figure). Background object 616, a pyramid in the desert sand, is displayed on integrated display 112 of mobile device 108. Using predefined models of how a majority of users hold their mobile devices, an estimate of where the holder's head, body, etc. is located in relation to a reference point on the mobile device can be used to render an avatar so that it appears to better portray the actual position of the user. For example, the bridge of a user's nose may be estimated to be 14 inches away along a line extending perpendicularly from the center of the integrated display or a user's controller that does not have an integrated display. This offset can be used to shift the avatar's head to this position. The rest of the avatar's body can be filled downward to the ground. In some embodiments, facial and motion tracking can be used to track the user's body directly.

Figure 7:
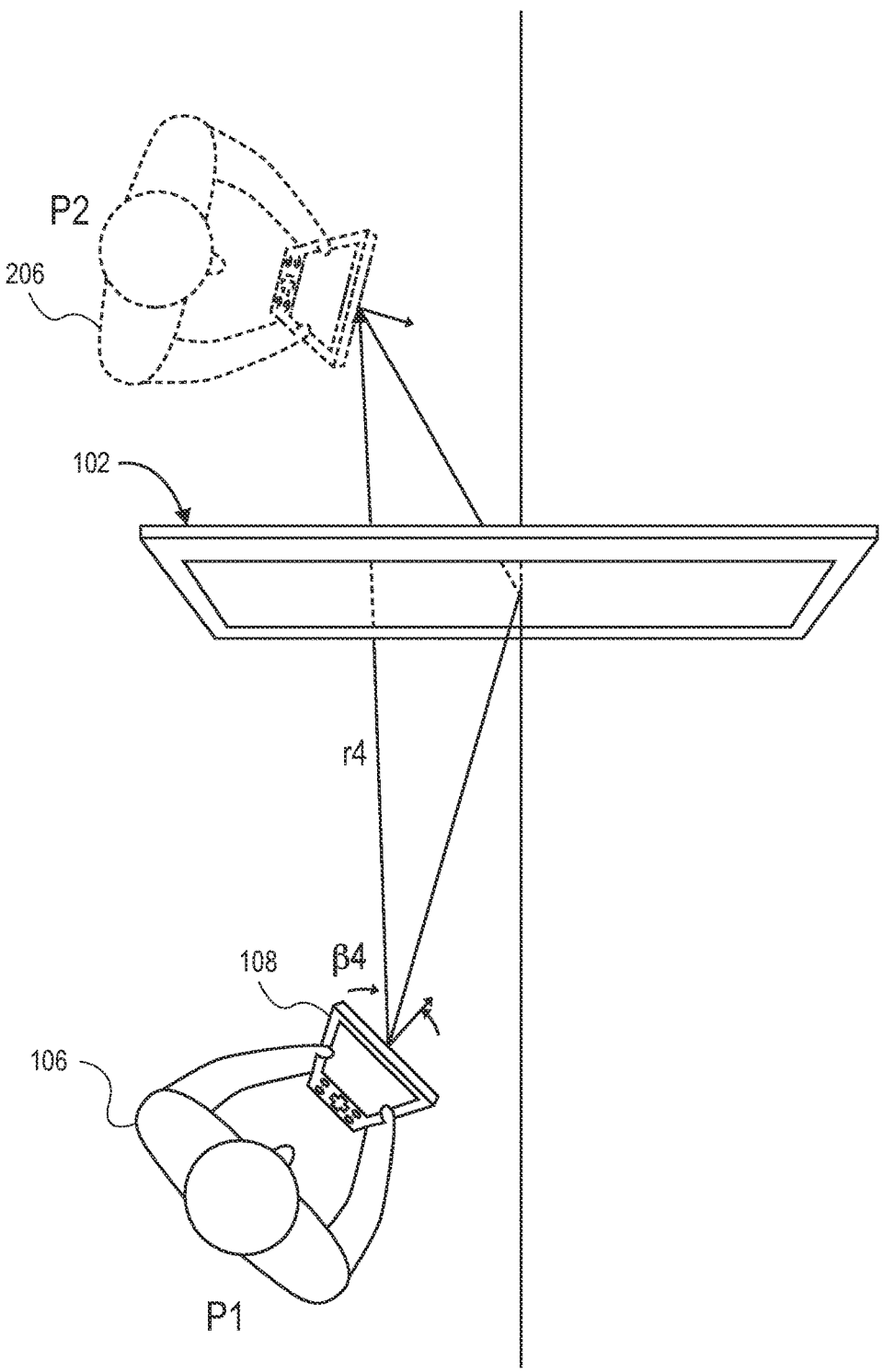
FIG. 7 illustrates a virtual relative direction and range from a first user to a second user in accordance with an embodiment.

FIG. 7 illustrates a virtual relative direction and range from a first user to a second user. Second user 206 can be made to appear as a mirror or 180° rotated image through the center of fixed display 102. Using vector addition and subtraction, a virtual direction β4 and virtual range r4 can be calculated such that opposing player 206 appears to be across from first user 106. If the opposing player steps to forward to move toward the left of his screen (see figure), the display on player 106's mobile device 108 will show player 206's avatar move right.

This mirrored movement can be useful to simulate games in which players play across from one another, such as tennis, handball, chess, etc. This can be used by players in the same room with the same, central fixed display or by players in different rooms with their own displays.

Figure 8:
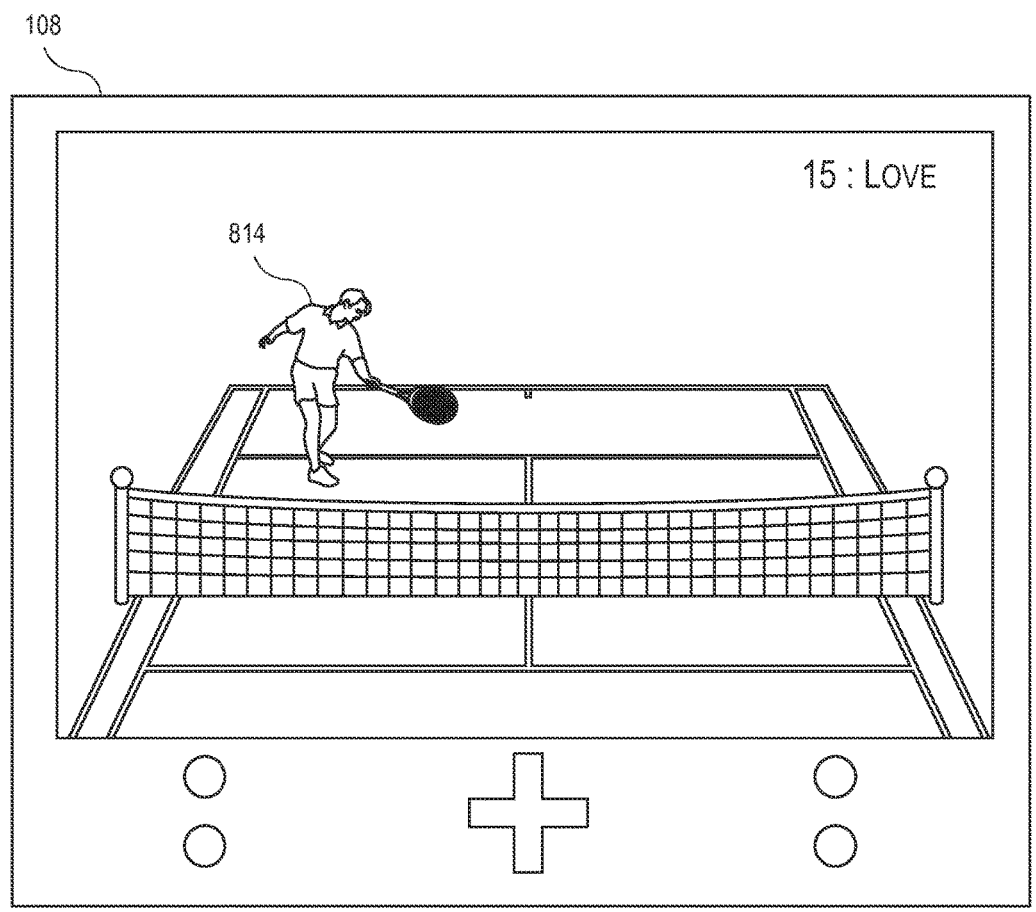
FIG. 8 illustrates a screen view of an avatar in the virtual direction and range from the first user to the second user of FIG. 7 in accordance with an embodiment.

FIG. 8 illustrates a screen view of an avatar in the virtual direction and range from the first user to the second as shown in FIG. 7. As player 206 physically moves in front of his fixed display, player 106 (not shown in this figure) sees avatar 814 representing player 206 move across the display on the integrated display of mobile device 108. If mobile device 108 is moved, the tennis court, avatar 814, and other elements of the view move oppositely so that it appears that the virtual world is inertially stabilized with respect to the real, physical world.

Figure 9:
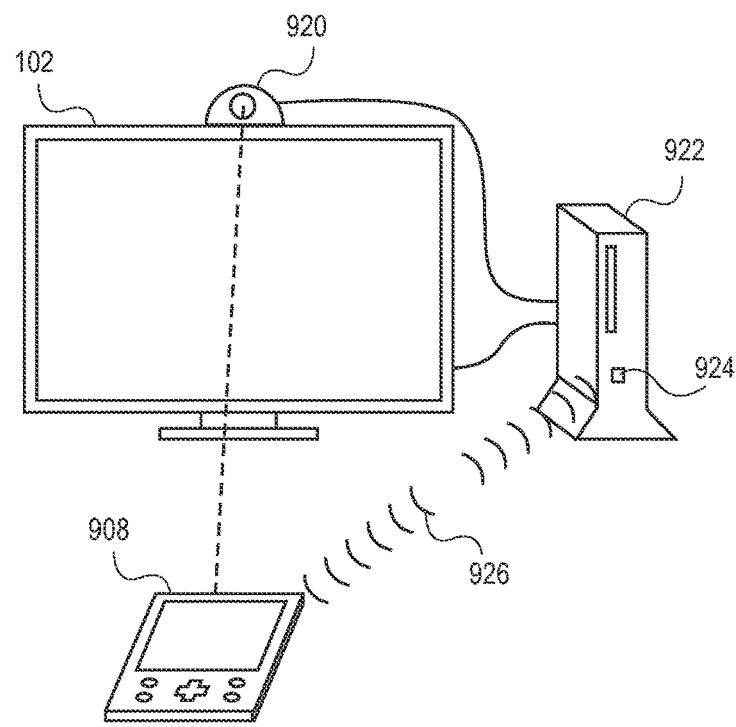
FIG. 9 illustrates an off-board camera system for tracking the position of a mobile device in accordance with an embodiment.

FIG. 9 illustrates an off-board camera system for tracking the position of a mobile device. Video camera 920 sits in a convenient, fixed position atop fixed display 102 and tracks mobile device 908 using infrared, radio frequency, visible light, or other suitable methods. For example, video camera 920 may track a piece of reflective tape on mobile device 908.

Camera 920 can also be enabled to track faces as is known in the art. Facial tracking technology can work to directly determine the position and view direction of a player's head, eyes, nose, etc. A camera on mobile device 908 can also be used to track the player's head.

Video game console 922 connects to camera 920 and fixed display 102. Video game console connects wirelessly, through wireless port 924, with mobile device 908 through wireless link 926. Wireless link 926 can be radio frequency, infrared, etc. The camera may output the position of tracked objects to console 922, or the camera may output raw video to console 922 and console 922 processes the raw video to determine the position, velocity, etc. of tracked objects.

Console 922 can send the coordinates of the tracked objects to mobile device 908 along with the determined view direction of mobile device 908. Mobile device 908 can then use the coordinates and view direction to render an avatar in the correct position on its screen.

In some embodiments, wireless link 926 can be used to send remote control-like commands to the video display. For example, a cellular phone can be used to turn up or down the volume on a television.

Figure 10:
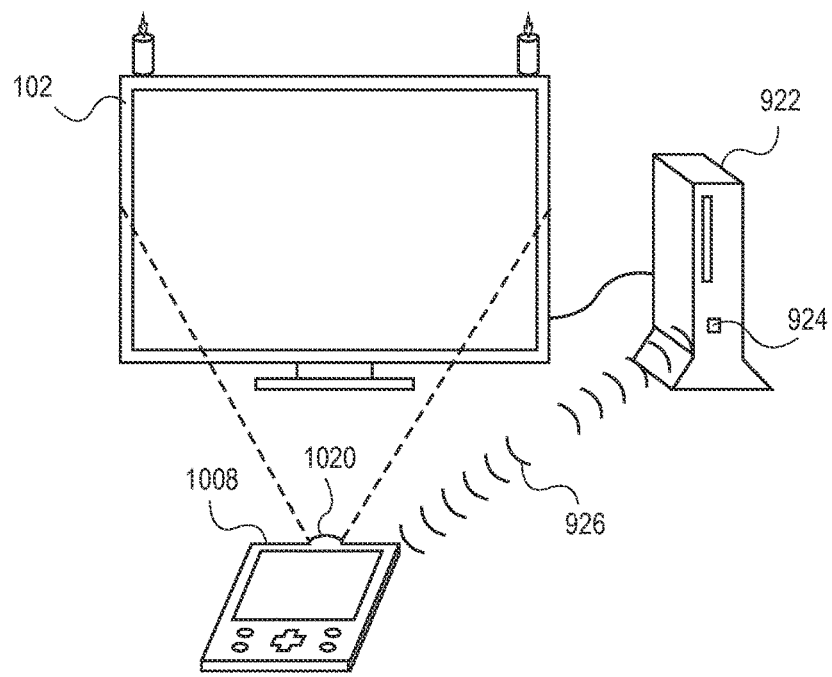
FIG. 10 illustrates an on-board camera system for tracking the position of a mobile device in accordance with an embodiment.

FIG. 10 illustrates an on-board camera system for tracking the position of a mobile device. Mobile device 1008 includes video camera 1020. Video camera 1020 tracks the rectangular screen of display 102, markers on the screen, or markers off the screen, such as infrared sources as known in the art. Markers on the screen can be in the corners of the screen and be rendered at a predetermined frequency so that mobile device 1008 can positively track the screen. The markers can include bar codes, two-dimensional codes, or be modulated in time to send information from fixed display 102 to mobile device 1008. Console 922 can send the coordinates of the opposing user's mobile device to mobile device 1008 through wireless port 924 and wireless link 926, and mobile device 1008 can use those coordinates, along with its internally determined coordinates and view direction, to render an avatar in the correct position on its screen. A camera on mobile device 1008 facing the player can also be used to track the player's head.

The position of mobile device 1008 can be used as an input to a video game. For example, a user can pace around his living room floor, marking locations where she will have her battleships for a virtual board game of Battleship®. In another example, a virtual game of 'Marco Polo' can be played in which players attempt to guess the location of other players without the use of their eyes. A player could move around his T.V. room in order to simulate his virtual position on a field or in a pool.

In other embodiments, the mobile device can automatically determine its position and view direction using a Global Positioning System (GPS) receiver, accelerometer-based inertial system, mechanical or solid-state gyroscope, electronic magnetic compass, radio frequency triangulation, and/or other methods known in the art.

Figure 11:
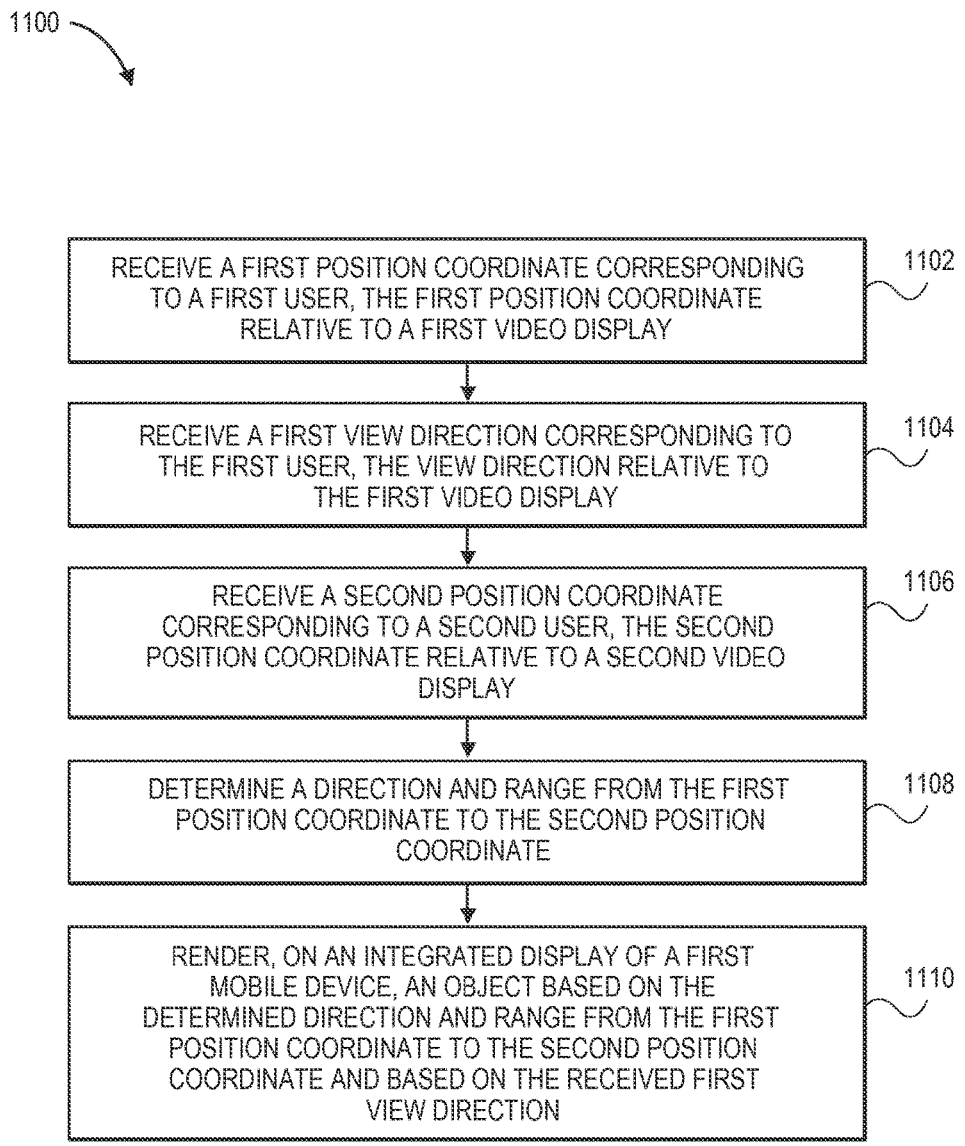
FIG. 11 is a flowchart illustrating a process in accordance with an embodiment.

FIG. 11 shows an example flowchart illustrating process 1100 in accordance with one embodiment. This process can be automated in a computer or other machine and can be coded in software, firmware, or hard coded as machine-readable instructions and run through one or more processors that can implement the instructions. In operation 1102, a first position coordinate corresponding to a first user is received, the first position coordinate being relative to a first video display. In operation 1104, a first view direction corresponding to the first user is received, the view direction being relative to the first video display. In operation 1106, a second position coordinate corresponding to a second user is received, the second position coordinate being relative to a second video display. In operation 1108, a direction and range from the first position coordinate to the second position coordinate are determined. In operation 1110, an object is rendered, on an integrated display of a first mobile device, based on the determined direction and range from the first position coordinate to the second position coordinate and based on the received first view direction. These operations may be performed in the sequence given above or in different orders as applicable.

Figure 12:
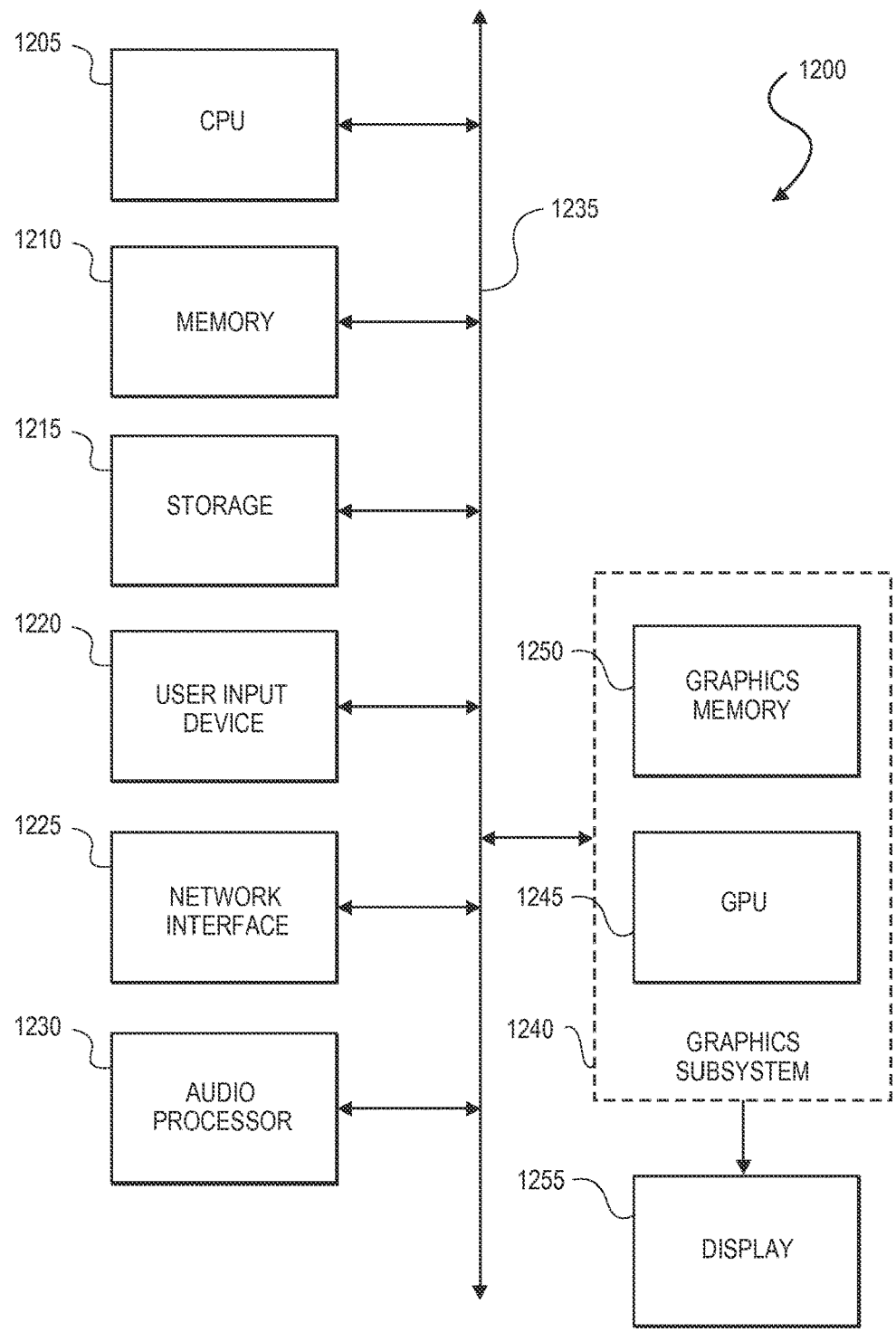
FIG. 12 is an example computer system suitable for use with embodiments of the invention.

FIG. 12 illustrates an example of a hardware system suitable for implementing a device in accordance with various embodiments. This block diagram illustrates a computer system 1200, such as a personal computer, video game console and associated display (e.g., video game console 922 and fixed display 102 of FIG. 9, mobile device (e.g., mobile device 108 of FIG. 1), personal digital assistant, or other digital device, suitable for practicing embodiments of the invention. Computer system 1200 includes a central processing unit (CPU) 1205 for running software applications and optionally an operating system. CPU 1205 may be made up of one or more homogeneous or heterogeneous processing cores. Memory 1210 stores applications and data for use by the CPU 1205. Storage 1215 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1220 communicate user inputs from one or more users to the computer system 1200, examples of which may include keyboards, mice, joysticks, touch pads, touch screens, still or video cameras, and/or microphones. Network interface 1225 allows computer system 1200 to communicate with other computer systems via an electronic communications network, and may include wired or wireless communication over local area networks and wide area networks such as the Internet. An audio processor 1230 is adapted to generate analog or digital audio output from instructions and/or data provided by the CPU 1205, memory 1210, and/or storage 1215. The components of computer system 1200, including CPU 1205, memory 1210, data storage 1215, user input devices 1220, network interface 1225, and audio processor 1230 are connected via one or more data buses 1235.

A graphics subsystem 1240 is further connected with data bus 1235 and the components of the computer system 1200. The graphics subsystem 1240 includes a graphics processing unit (GPU) 1245 and graphics memory 1250. Graphics memory 1250 includes a display memory (e.g., a frame buffer) used for storing pixel data for each pixel of an output image. Graphics memory 1250 can be integrated in the same device as GPU 1245, connected as a separate device with GPU 1245, and/or implemented within memory 1210. Pixel data can be provided to graphics memory 1250 directly from the CPU 1205. Alternatively, CPU 1205 provides the GPU 1245 with data and/or instructions defining the desired output images, from which the GPU 1245 generates the pixel data of one or more output images. The data and/or instructions defining the desired output images can be stored in memory 1210 and/or graphics memory 1250. In an embodiment, the GPU 1245 includes 3D rendering capabilities for generating pixel data for output images from instructions and data defining the geometry, lighting, shading, texturing, motion, and/or camera parameters for a scene. The GPU 1245 can further include one or more programmable execution units capable of executing shader programs.

The graphics subsystem 1240 periodically outputs pixel data for an image from graphics memory 1250 to be displayed on display device 1255. Display device 1255 can be any device capable of displaying visual information in response to a signal from the computer system 1200, including CRT, LCD, plasma, and OLED displays. Computer system 1200 can provide the display device 1255 with an analog or digital signal.

In accordance with various embodiments, CPU 1205 is one or more general-purpose microprocessors having one or more processing cores. Further embodiments can be implemented using one or more CPUs with microprocessor architectures specifically adapted for highly parallel and computationally intensive applications, such as media and interactive entertainment applications.

The components of the system 108 of FIG. 1 and system 208 of FIG. 2 may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for augmented video, the system comprising:
   a video source configured to provide video content to a first video display; and
   a mobile device with an integrated video camera and second display, the first video display being different from the second display of the mobile device, the mobile device configured to:
   track a distance and direction of the first video display relative to the mobile device using the video camera;
   determine a first position coordinate of the mobile device using the tracked relative distance and direction; and
   render, on the second display, a first object in a position on the second display, wherein the first object corresponds to another mobile device, and wherein the position of the first object is based on the determined first position coordinate of the mobile device and a determined second position coordinate of the other mobile device, wherein the video source and mobile device are configured to execute a video game and the first position coordinate input to the video game.

2. The system of claim 1 wherein the mobile device is configured to control the video display.

3. The system of claim 1 wherein the mobile device comprises glasses having an integrated display in at least one lens of the glasses.

4. The system of claim 1 wherein the mobile device tracks the first video display using one or more markers on the first video display.

5. The system of claim 4 wherein the markers are in the corners of the first video display and are rendered at a predetermined frequency.

6. The system of claim 1 wherein the first position coordinate of the mobile device is further determined using an orientation of a hand holding the mobile device.

7. The system of claim 1 wherein the mobile device is further configured to:
   receive the determined second position coordinate that is relative to the first video display; and
   render on the second display, a second object in a position based on the determined first position coordinate.

8. The system of claim 7 wherein the first and second displays display the first object as a 180° rotated image through the center of the first and second displays, such that the first object appears to be across from the second object.

9. The system of claim 7 wherein the first object is an avatar displayed as if it were co-located with a second user of the other mobile device from a vantage point of a first user of the mobile device.

10. The system of claim 7 wherein the second display appears to be transparent, except for displaying the first object.

11. A method for augmenting video, comprising:
    providing, by a video source, video content to a first video display;
    tracking, by a mobile device with an integrated video camera and second display, a distance and direction of the first video display relative to the mobile device using the video camera;
    determining, by the mobile device, a first position coordinate of the mobile device using the tracked relative distance and direction; and rendering, on the second display, a first object in a position on the second display, wherein the first object corresponds to another mobile device, and wherein the position of the first object is based on the determined first position coordinate of the mobile device and a determined second position coordinate of the other mobile device, wherein the video source and mobile device are configured to execute a video game, the first position coordinate input to the video game, and the first video display being different from the second display of the mobile device.

12. The method of claim 11 wherein the mobile device is configured to control the video display.

13. The method of claim 11 wherein the mobile device comprises glasses having an integrated display in at least one lens of the glasses.

14. The method of claim 11 wherein the mobile device tracks the first video display using one or more markers on the first video display.

15. The method of claim 11 wherein the first position coordinate of the mobile device is further determined using an orientation of a hand holding the mobile device.

16. The method of claim 11 further comprising:
receiving by the mobile device the determined second position coordinate that is relative to the first video display relative to the first video display; and
rendering on the second display, a second object in a position based on the determined first position coordinate.

17. The method of claim 16 wherein the first and second displays display the first object as a 180° rotated image through the center of the first and second displays, such that the first object appears to be across from the second object.

18. The method of claim 16 wherein the first object is an avatar displayed as if it were co-located with a second user of the other mobile device from a vantage point of a first user of the mobile device.

19. The method of claim 16 wherein the second display appears to be transparent, except for displaying the first object.

20. A machine-readable non-transitory storage medium embodying information indicative of instructions for causing one or more machines to perform operations, the operations comprising:
providing, by a video source, video content to a first video display;
tracking, by a mobile device with an integrated video camera and second display, a distance and direction of the first video display relative to the mobile device using the video camera;
determining, by the mobile device, a first position coordinate of the mobile device using the tracked relative distance and direction; and
rendering, on the second display, a first object in a position on the second display, wherein the first object corresponds to another mobile device, and wherein the position of the first object is based on the determined first position coordinate of the mobile device and a determined second position coordinate of the other mobile device, wherein the video source and mobile device are configured to execute a video game, the first position coordinate input to the video game, and the first video display being different from the second display of the mobile device.

* * * * *